United States Patent
Kyoo

(10) Patent No.: US 10,237,428 B2
(45) Date of Patent: Mar. 19, 2019

(54) SYSTEMS, METHOD, AND RECORDING MEDIUM FOR STORING PROGRAM FOR ADVERTISEMENT ACCORDING TO LOCATION OF PRINTER

(71) Applicant: Konica Minolta, Inc., Chiyoda-ku, Tokyo (JP)

(72) Inventor: Shunsaku Kyoo, Hyogo (JP)

(73) Assignee: KONICA MINOLTA, INC., Chiyoda-ku, Tokyo (JP)

(*) Notice: Subject to any disclaimer, the term of this patent is extended or adjusted under 35 U.S.C. 154(b) by 0 days.

(21) Appl. No.: 15/477,946

(22) Filed: Apr. 3, 2017

(65) Prior Publication Data
US 2017/0310835 A1    Oct. 26, 2017

(30) Foreign Application Priority Data
Apr. 21, 2016    (JP) .................. 2016-084907

(51) Int. Cl.
| | | |
|---|---|---|
| H04N 1/00 | (2006.01) | |
| G06F 3/12 | (2006.01) | |
| G06K 15/02 | (2006.01) | |
| G06Q 30/02 | (2012.01) | |

(52) U.S. Cl.
CPC ....... *H04N 1/00411* (2013.01); *G06F 3/1203* (2013.01); *G06F 3/1236* (2013.01); *G06F 3/1237* (2013.01); *G06F 3/1288* (2013.01); *G06K 15/02* (2013.01); *G06Q 30/0273* (2013.01); *H04N 1/00015* (2013.01); *H04N 1/00244* (2013.01)

(58) Field of Classification Search
None
See application file for complete search history.

(56) References Cited

U.S. PATENT DOCUMENTS

| | | | |
|---|---|---|---|
| 2008/0065477 A1* | 3/2008 | Korhonen | G06Q 30/02 705/14.49 |
| 2010/0088178 A1* | 4/2010 | Gnanasambandam | G06Q 30/02 705/14.49 |

FOREIGN PATENT DOCUMENTS

| | | |
|---|---|---|
| JP | 11-192760 A | 7/1999 |
| JP | 2004-213182 A | 7/2004 |

* cited by examiner

*Primary Examiner* — Andrew H Lam
(74) *Attorney, Agent, or Firm* — Squire Patton Boggs (US) LLP

(57) ABSTRACT

An advertisement providing system is provided which outputs an advertisement when a printer prints a document. The system includes a display unit configured to display a screen for selecting a recipient that is to receive a printed matter of the document when a distance between a first position and a second position is longer than a predetermined distance, or, alternatively, when the first position and the second position are located in different areas, the first position showing where an instruction source giving a command to print the document is located, the second position showing where the printer is installed; and an output interface configured to output, when the printer prints the document, an advertisement depending on attributes of the recipient selected.

17 Claims, 21 Drawing Sheets

| USER CODE | USER NAME | DEPARTMENT | INTEREST | |
|---|---|---|---|---|
| A001 | SMITH | ACCOUNTING DEPARTMENT | SPORTS, MUSIC | ~ 5A |
| A002 | JONES | DEVELOPMENT DEPARTMENT | TRIP | ~ 5A |
| A003 | TAYLOR | GENERAL AFFAIRS DEPARTMENT | INVESTMENT, ECONOMICS | ~ 5A |
| ⋮ | ⋮ | ⋮ | ⋮ | |

| ADVERTISEMENT CODE | TARGET | ADVERTISEMENT DATA |
|---|---|---|
| A001 | SALES DEPARTMENT | —5B |
| A002 | PERSONNEL DEPARTMENT | —5B |
| A003 | DEVELOPMENT DEPARTMENT | —5B |
| ⋮ | ⋮ | ⋮ |

| IP ADDRESS | INSTALLATION LOCATION | |
|---|---|---|
| 192.168.10.1 | N34.793698123 E135.411946222 | ~5C |
| 192.168.10.2 | N34.846153000 E135.612189111 | ~5C |
| 192.168.10.3 | N34.841482555 E137.342428333 | ~5C |
| ⋮ | ⋮ | |

| USER CODE | E-MAIL ADDRESS |
|---|---|
| A001 | a001@example.com | ~5D
| A002 | a002@example.com | ~5D
| A003 | a003@example.com | ~5D
| ⋮ | ⋮ |

```
%-12345X@PJL JOB
@PJL COMMENT
@PJL INFO_DEVICE_IPADDRESS="192.168.101.101"
@PJL INFO_DEVICE_GPS_NAVIGATE="N 324.436328001 E135.243937999"
@PJL SET USERNAME = "salesA"
@PJL SET PCNAME = "PC1"
@PJL SET KMCERTSERVTYPE = NONE
@PJL SET QTY = 1
@PJL SET PLANESINUSE = 3
@PJL SET RECEIVER = "A003"
) HP-PCL XL;2;1;

⋮
```

SYSTEMS, METHOD, AND RECORDING MEDIUM FOR STORING PROGRAM FOR ADVERTISEMENT ACCORDING TO LOCATION OF PRINTER

The present U.S. patent application claims a priority under the Paris Convention of Japanese patent application No. 2016-084907 filed on Apr. 21, 2016, the entirety of which is incorporated herein by reference.

BACKGROUND OF TIM INVENTION

1. Field of the Invention

The present invention relates to a technique for outputting an advertisement at the time of printing a document.

2. Description of the Related Art

Image forming apparatuses into which functions such as copying, network printing, faxing, scanning, and file server are integrated have attained widespread use. In general, such an image forming apparatus is sometimes called a "multi-function device" or a "Multi-Functional Peripheral (MFP)".

There has been proposed a system in which an advertisement fee is collected from an advertiser by printing a document together with an advertisement onto paper to reduce the burden of printing costs on a user.

In relation to the widespread use of digital signage technology, another system has been proposed. According to the system, an advertisement fee is collected by displaying an advertisement on a display unit of an image forming apparatus to reduce the burden of printing costs on a user.

For example, an advertisement distribution system is disclosed in Japanese Laid-open Patent Publication No. 2004-213182. According to the advertisement distribution system, an advertiser's terminal connects to a server of an advertisement distributor, extracts copiers matching the requirements for advertisement distribution, and creates and registers the advertisements to be distributed. Advertisement numbers are imparted to the advertisements created, which are then distributed to the copiers extracted. When the user of each copier outputs the advertisements to use them at the advertiser's store or the like, the advertiser causes the advertisement numbers imparted to the advertisements to be fed back to the server. Advertisements with special contents are distributed to the copiers that use advertisements at higher frequencies. By feeding back the advertisement numbers, the advertising fees are returned to the advertisers and the charges for copier maintenance are discounted.

For example, an image forming apparatus is disclosed in Japanese Laid-open Patent Publication No. 11-192760. According to the image forming apparatus, in a digital copier having a function to connect to a network, a combined circuit is provided for combining images to be combined downloaded from the network onto a combined image memory to an original image read by a CCD. For example, the images to be combined are an advertisement image from an image provision server.

Further, there has been proposed a cloud print technology these days. According to the technology, a cloud print server receives document data via the Internet from a terminal. The cloud print server converts the document data received to a particular language appropriately, and sends the resultant data to an image forming apparatus. The mage forming apparatus prints a document onto paper based on the data received from the cloud print server.

As discussed above, the new technologies for printing a document have been proposed. It is desirable for both an advertiser and users to provide a suitable advertisement to the users. This is advantageous to the adviser as it enhances the advertising effectiveness, and also advantageous to the users as it exposes them more to interesting information.

SUMMARY

The present invention has been achieved in light of such a desire, and therefore, an object of an embodiment of the present invention is to provide, in cloud print, an advertisement suitable for a user more securely than conventionally possible.

To achieve at least one of the objects mentioned above, according to an aspect, an advertisement providing system for outputting an advertisement when a printer prints a document, the system includes a display unit configured to display a screen for selecting a recipient that is to receive a printed matter of the document when a distance between a first position and a second position is longer than a predetermined distance, or, alternatively, when the first position and the second position are located in different areas, the first position showing where an instruction source giving a command to print the document is located, the second position showing where the printer is installed; and an output interface configured to output, when the printer prints the document, an advertisement depending on attributes of the recipient selected.

To achieve at least one of the objects mentioned above, according to another aspect, a print control system for controlling a printer to print a document sent from a terminal, the system includes a processor; and a transmitter; wherein the processor performs display control processing for displaying a screen for requesting an instruction source giving a command to print the document to select a recipient that is to receive a printed matter of the document when a distance between a first position and a second position is longer than a predetermined distance, or, alternatively, when the first position and the second position are located in different areas, the first position showing where the in source is located, the second position showing where the printer is installed, the transmitter sends, when the instruction source selects the recipient, as advertisement data, first data used for outputting an advertisement depending on attributes of the recipient to the printer, and the transmitter sends document data for printing the document to the printer.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIG. 8 is a diagram showing an example of user data;

FIG. 9 is a diagram showing an example of advertisement data;

FIG. 10 is a diagram showing an example of multifunction device data;

FIG. 11 is a diagram showing an example of terminal data;

FIG. 16 is a diagram showing an example of job data;

DESCRIPTION OF TEE PREFERRED EMBODIMENTS

Hereinafter, an embodiment of the present will be described with reference to the drawings. However, the scope of the invention is not limited to the illustrated examples.

Figure 1:
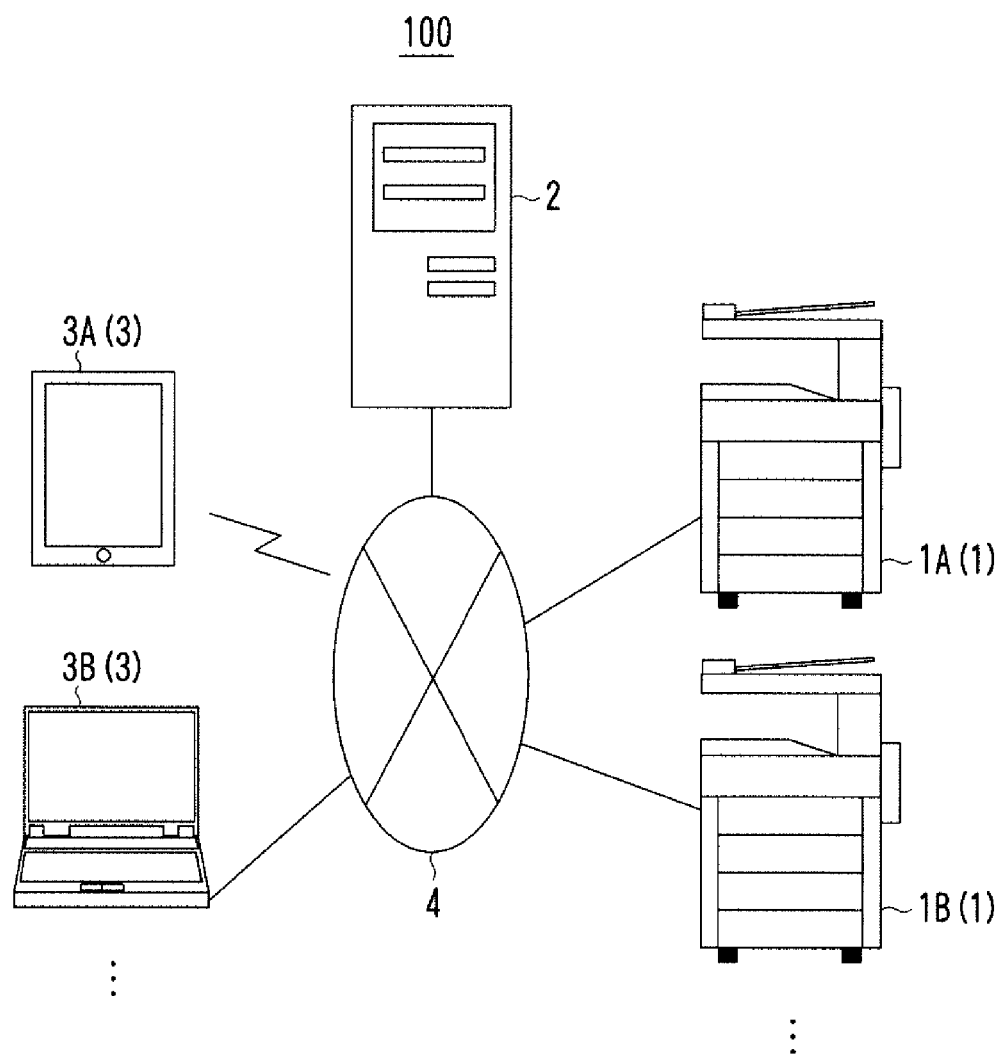
FIG. 1 is a diagram showing an example of the overall configuration of a printing system.
Figure 2:
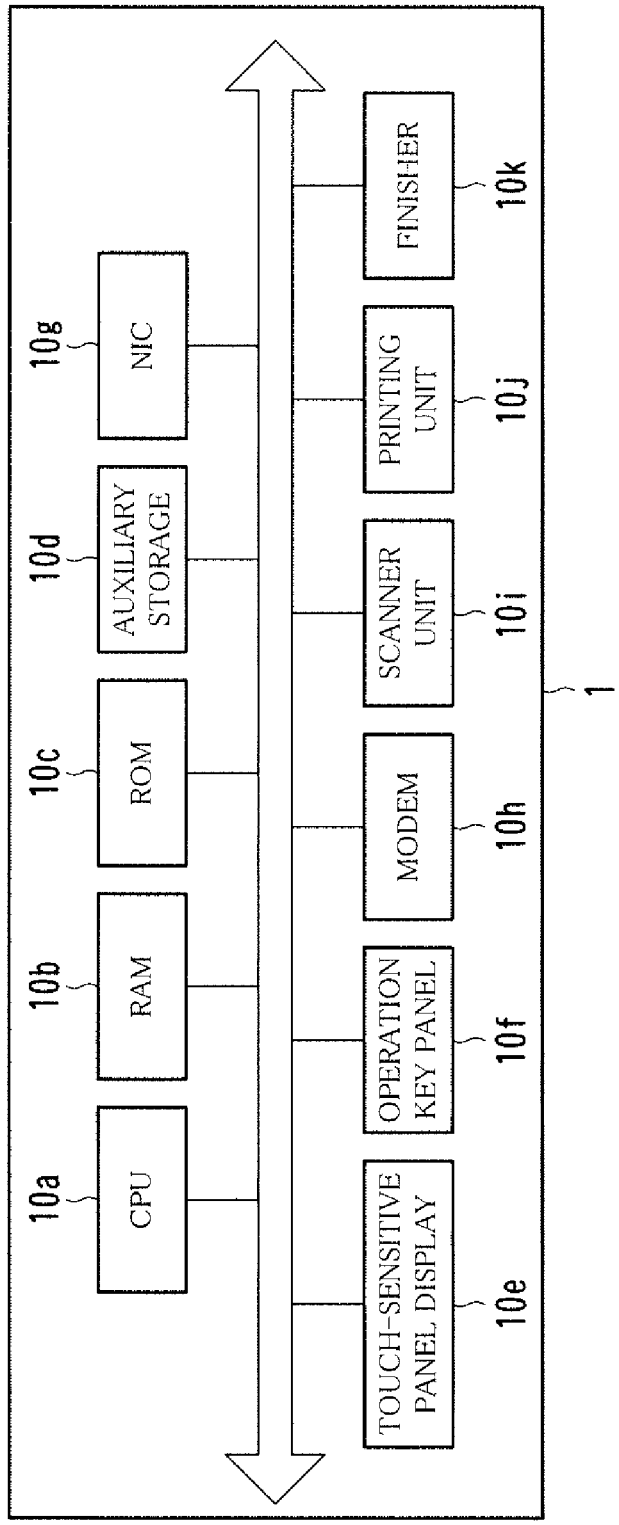
FIG. 2 is a diagram showing an example of the hardware configuration of an image forming apparatus.
Figure 3:
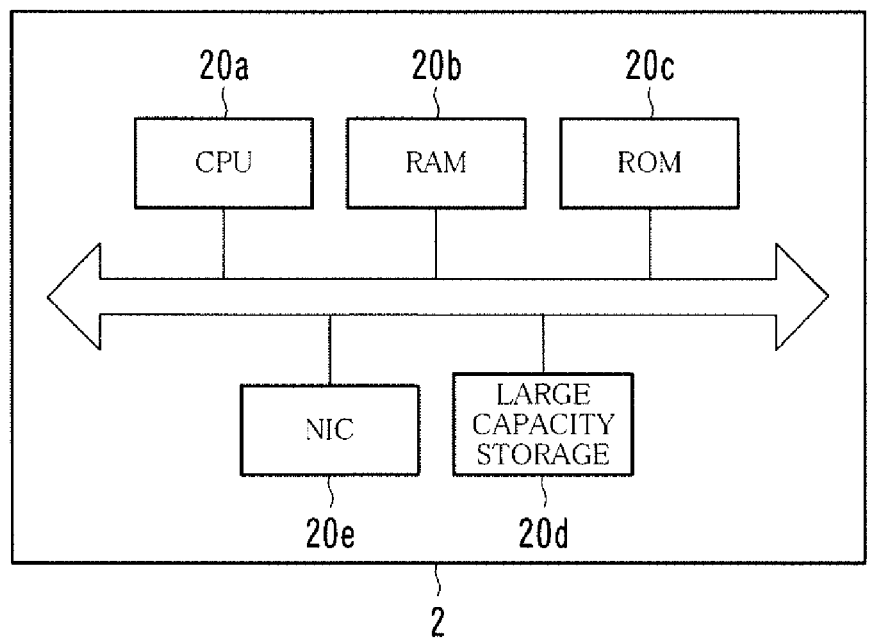
FIG. 3 is a diagram showing an example of the hardware configuration of a cloud print server.
Figure 4:
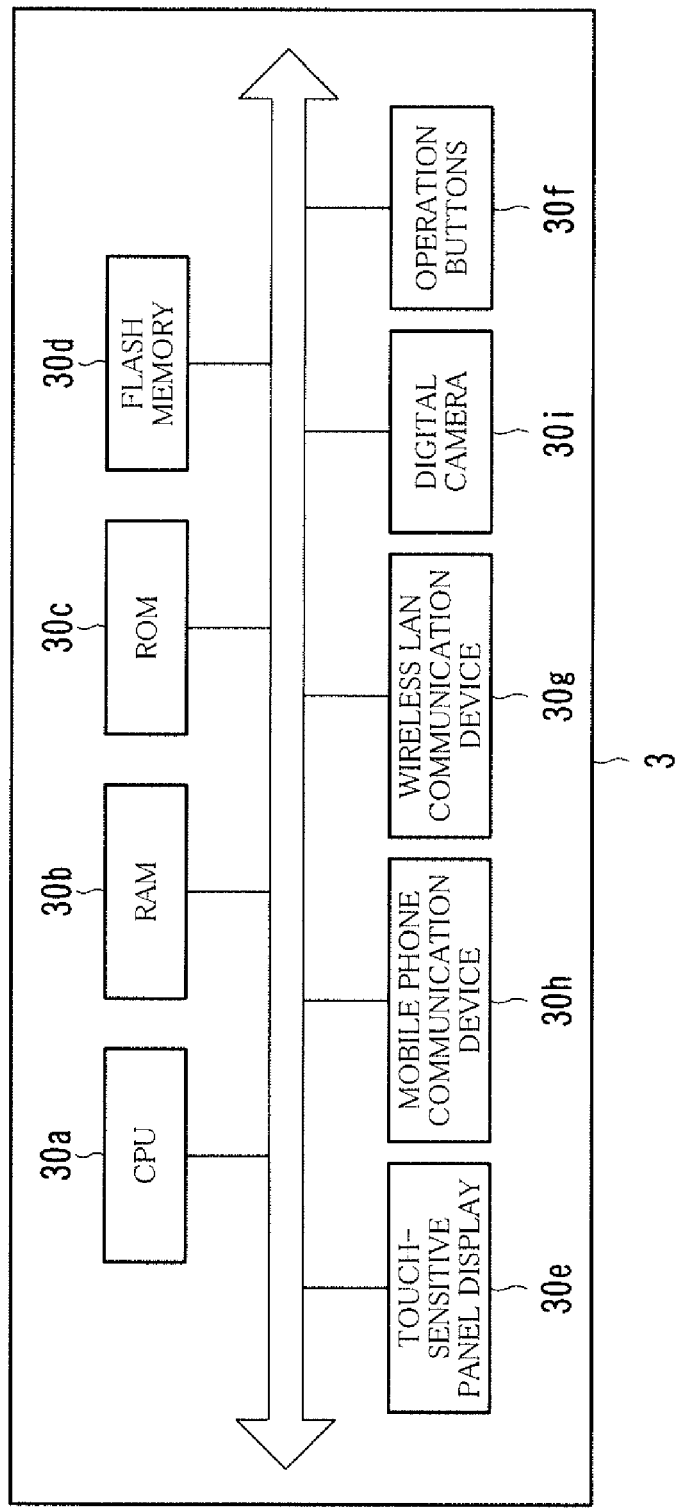
FIG. 4 is a diagram showing an example of the hardware configuration of a terminal.

FIG. 1 is a diagram showing an example of the overall configuration of a printing system 100. FIG. 2 is a diagram showing an example of the hardware configuration of an image forming apparatus 1. FIG. 3 is a diagram showing an example of the hardware configuration of a cloud print server 2. FIG. 4 is a diagram showing an example of the hardware configuration of a terminal 3.

Referring FIG. 1, the printing system 100 is configured of a plurality of the image forming apparatuses the cloud print server 2, a plurality of the terminals 3, a communication line 4, and so on.

The image forming apparatuses 1, the cloud print server 2, and the terminals 3 are configured to perform communication via the communication line 4. Examples of the communication line 4 are a Local Area Network (LAN), the Internet, a mobile phone network, a public line, and a dedicated line.

The printing system 100 is to print a document onto paper. When printing the document, the document printing system 100 provides a user with an advertisement. An operator of the printing system 100 collects an advertisement fee from an advertiser, which covers a part or the whole of the operating cost of the printing system 100.

The following description takes an example where the printing system 100 is used in a company. Thus, employees of the company are users of the printing system 100. Each of the users given a unique user code advance.

The image forming apparatuses 1 are sometimes referred to as an "image forming apparatus 1A", "image forming apparatus 1B", . . . , and so on to distinguish one from another. Likewise, the terminals 3 are sometimes referred to as a "terminal 3A", "terminal 3B", . . . , and so on to distinguish one from another.

The image forming apparatus 1 is an apparatus into which functions such as copying, PC printing, cloud print, faxing, scanning, and box function are consolidated. The image forming apparatus 1 is generally called a "multifunction device" or a "Multi-Functional Peripheral (MFP)".

The PC printing function is to print an image onto paper based on image data received from a terminal (terminal 3 in this embodiment) without using a sever. The PC printing function is sometimes called "network printing" or "network print".

The cloud print function is to print a document by using data received from a terminal (terminal 3 in this embodiment) via a server on the Internet (cloud print server 2 in this embodiment).

According to the box function, each user is given a storage area called a "box" or a "personal box". The box function enables each user to save image data and so on to his/her storage area and to manage the same therein. A box may be provided for each group so that members of the group share the box. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 105, an operating key panel 10f, a Network Interface Card (NIC) 10g, a modem 10h, a scanner unit 10i, a printing unit 10j, a finisher 10k, and so on.

It is noted that some of the image forming apparatuses 1 are not provided with the touch-sensitive panel display 10e. The case is described below in which the image forming apparatus 1A is provided with the touch sensitive panel display 10e, and the image forming apparatus 1B is not provided with the touch-sensitive panel display 10e.

The touch-sensitive panel display 10e displays for example, a screen for presenting messages to a user a screen for allowing the user to input commands or information, a screen for showing the results of processing executed by the CPU 10a. The touch-sensitive panel display 105 sends a signal indicating a touched location to the CPU 10a.

The operating key panel 10f is a so-called hardware keyboard. The operating key panel 10f has numeric h keys, art key, a stop key, and a function key.

The NIC 10g performs communication with another device in accordance with a protocol such as Transmission Control Protocol/Internet Protocol (TCP/IP).

The modem 10h sends and receives image data with a facsimile terminal in accordance with a protocol such as G3.

The scanner unit 10i optically reads an image recorded on a sheet of paper placed on a platen glass to generate image data thereof.

The printing unit 10j prints, onto paper an image captured by the scanner unit 10i and an image sent by another device by using the NIC log or the modem 10h.

The finisher 10k applies post-processing, if necessary, to a printed matter obtained by the printing unit 10j. The post-processing includes stapling the printed matter with a stapler, punching a hole in the printed matter, and folding the printed matter.

Figure 5:
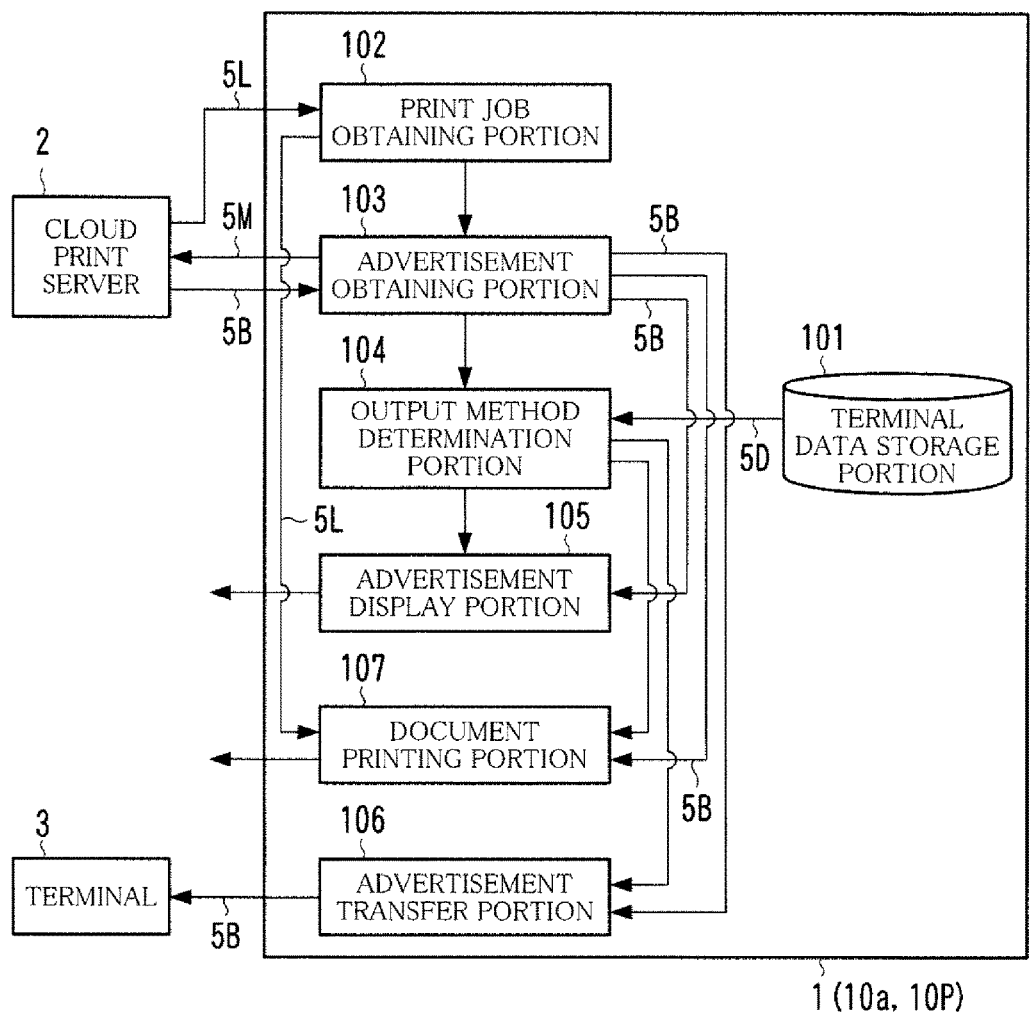
FIG. 5 is a diagram showing an example of the functional configuration of an image forming apparatus.

The ROM 10c or be auxiliary storage 10d stores, therein, a program for implementing the foregoing functions such as copying. The ROM 10c or the auxiliary storage 10d also stores, therein, an advertisement delivery program 10P (FIG. 5). The advertisement delivery program 10P is detailed later.

The programs are loaded into the RAM 10b as necessary, and are executed by the CPU 10a. The auxiliary storage 10d is, for example, a hard disk drive or a Solid State Drive (SSD).

The cloud print server 2 gives a print command to the image forming apparatus 1 based on a request from the terminal 3. The cloud print server 2 also delivers an advertisement to the terminal 3 and the image forming apparatus 1.

Referring to FIG. 3, the cloud print server configured of a CPU 20a, a RAN 20b, a ROM 20c, a large capacity storage 20d, an NIC 20e, and so on.

The NIC 20e performs communication with the image forming apparatus 1 or the terminal a in accordance with a protocol such as TCP/IP.

Figure 6:
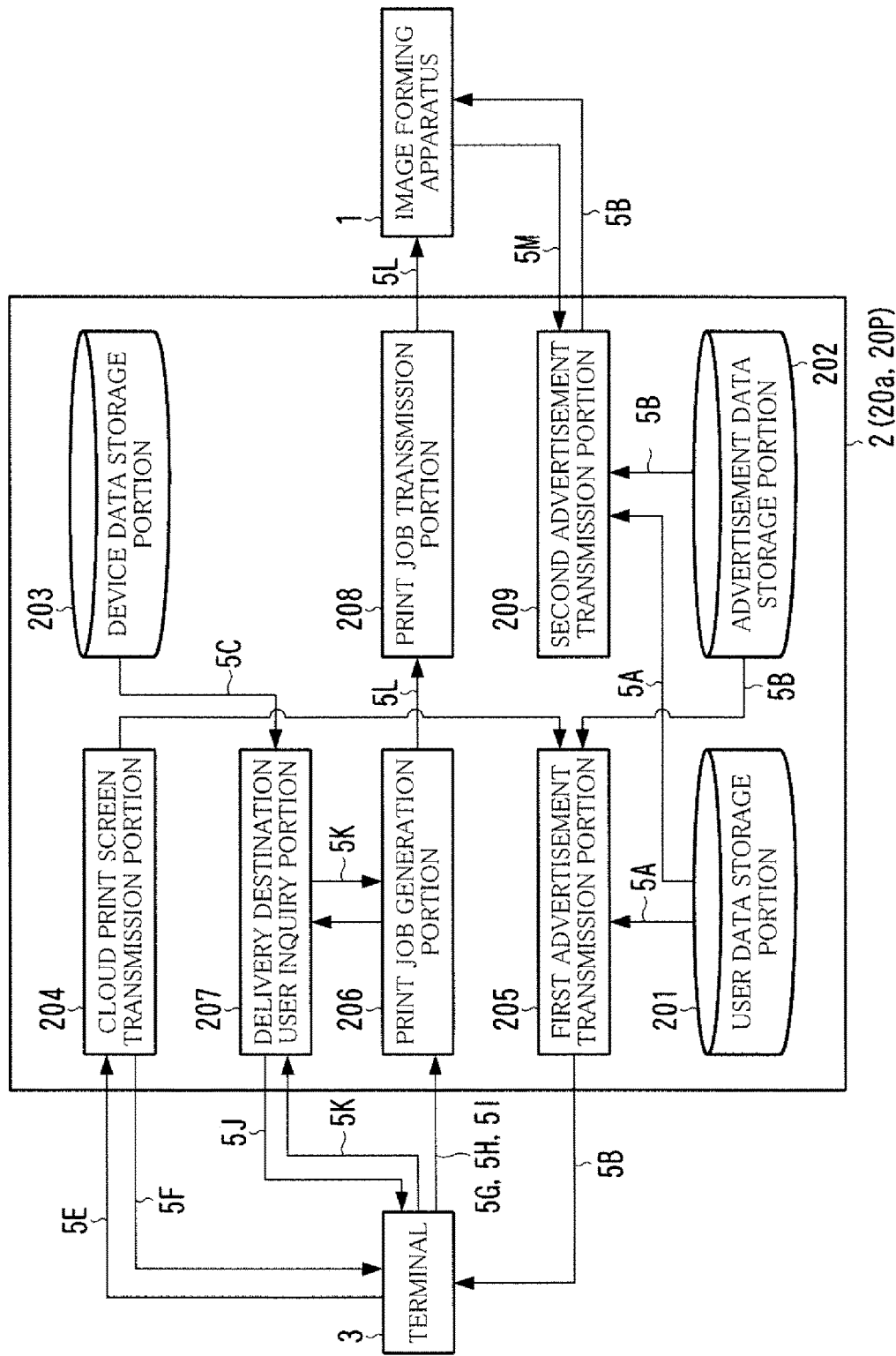
FIG. 6 is a diagram showing an example of the functional configuration of a cloud print server.

The ROM 20c or the large capacity storage 20d stores, therein, a print mediation program 20P (FIG. 6). The large capacity storage 20d is, for example, a hard disk drive or an SSD. The print mediation program 20P is loaded into the RAM 20b and is executed by the CPU 20a. The print mediation program 20P is detailed later.

The terminal 3 is a client of the image forming apparatus 1. The user can operate the terminal 3 to remotely use the functions of the image forming apparatus 1. The terminal 3 is usable also as a client of the cloud print server 2. Each user is given one terminal 3.

The terminal 3 is, for example, a personal computer, a smartphone, or a tablet computer. The case is described below in which the terminal 3 is a tablet computer.

Referring to FIG. 4, the terminal 3 is configured of a CPU 30a, a RAM 30b, a ROM 30c, a flash memory 30d, a touch-sensitive panel display 30e, operation buttons 30f, a wireless LAN communication device 30g, a mobile phone communication device 30h, a digital camera 30i, and so on.

The touch-sensitive panel display 30e displays different screens. The touch-sensitive panel display 30e detects a touched location thereon and informs the CPU 30a of the touched location.

The operation buttons 30f include a button for returning to a start screen, a button for controlling sound volume, and a button for switching between ON and OFF of the power source.

The wireless LAN communication device 30g performs communication based on the standard or wireless LAN, specifically, the standard for Institute of Electrical and Electronics Engineers (IEEE) 802.11.

The mobile phone communication device 30h performs communication through a mobile phone network based on the standard for Code Division Multiple Access (CDMA) 2000, Wideband-CDMA (W-CDMA), or Long Term Evolution (LTE).

The digital camera 30i captures an image to generate image data thereof. The digital camera 30i is also capable of shooting a moving image to generate image data thereof.

The ROM 30c or the flash memory 30d stores, therein, application programs such as an application program for document creation (word-processing software, spreadsheet software, or drawing software, for example), mailer, web browser, and schedulers. The ROM 30c or the flash memory 30d also stores, therein, a program which enables the remote use of the functions of the image forming apparatus 1, for example, a printer driver. The ROM 30c or the flash memory 30d further stores a client program 30P (FIG. 1) therein. The client program 30P is detailed later.

The programs are loaded into the RAM 30 as necessary, and are executed by the CPU 30a.

The use of the advertisement delivery program 10P, the print mediation program 20P, and the client program 30P in the process of cloud print enables delivery of an advertisement more suitable for a user than is conventionally possible. The mechanism thereof is described below.

Figure 7:
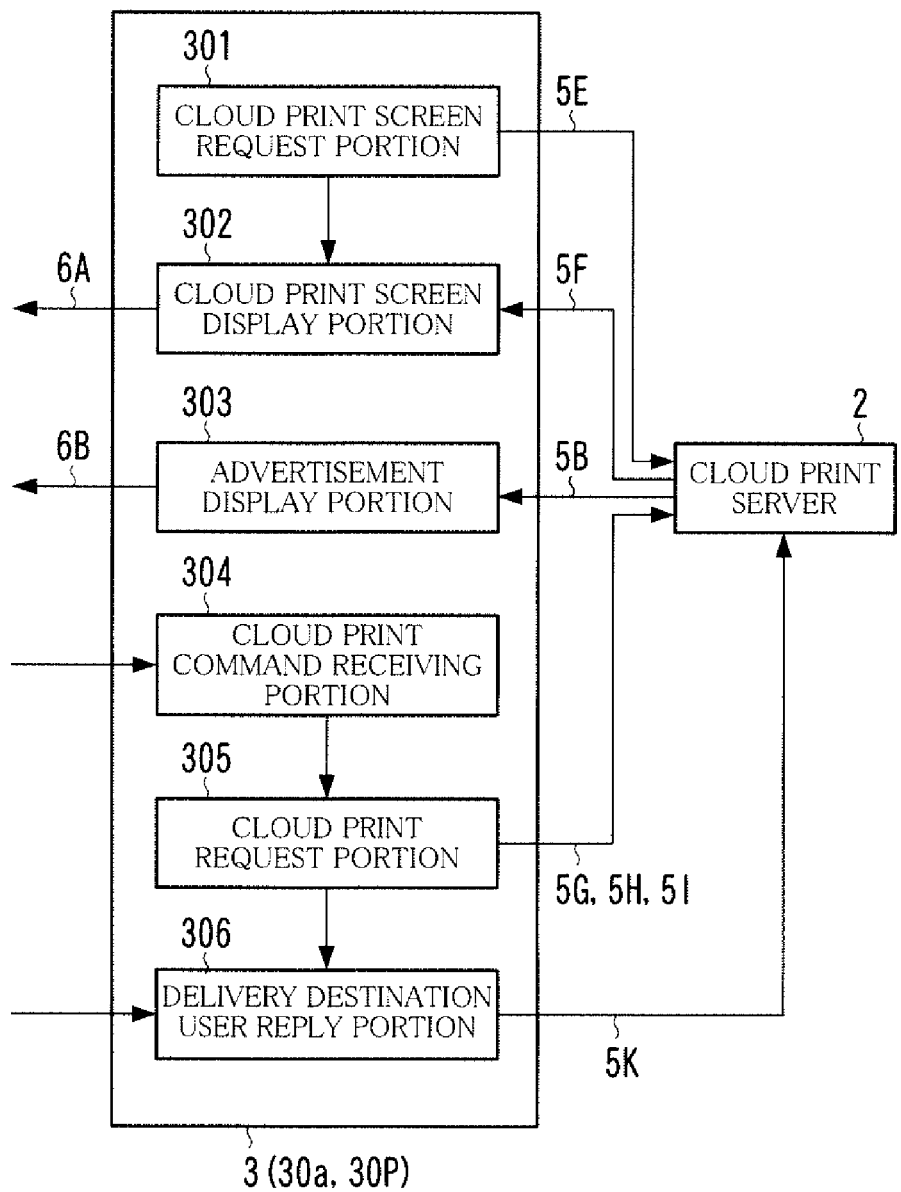
FIG. 7 is a diagram showing an example of the functional configuration of a terminal.

FIG. 5 is a diagram showing an example of the functional configuration of the image forming apparatus 1. FIG. 6 is a diagram showing an example of the functional configuration of the cloud print server 2. FIG. 7 is a diagram showing an example of the functional configuration of the terminal 3.

The advertisement delivery program 10P implements, in the image forming apparatus 1, the functions of a terminal data storage portion 101, a print job obtaining portion 102, an advertisement obtaining portion 102, an output method determination portion 104, an advertisement display portion 105, an advertisement transfer portion 106, a document printing portion 107 and so on, all of which are shown in FIG. 5.

The print mediation program 20P implements, in the cloud print server 2, the functions of a user data storage portion 201, an advertisement data storage portion 202, a device data storage portion 203, a cloud print screen transmission portion 204, a first advertisement transmission portion 205, a print job generation portion 206, a delivery destination user inquiry portion 207, a print job transmission portion 208, a second advertisement transmission portion 209, and so on, all of which are shown in FIG. 6.

The client program 30P implements, in the terminal 3, the functions of a cloud print screen request portion 301, a cloud print screen display portion 302, an advertisement display portion 203, a cloud print command receiving portion 304, a cloud print request portion 305, a delivery destination user reply portion 306, and so on, all of which are shown in FIG. 7.

[Data Prepared in Advance]

FIG. 8 is a diagram showing an example of user data 5A. FIG. 9 is a diagram showing an example of advertisement data 5B. FIG. 10 is a diagram showing an example of multifunction device data 5C. FIG. 11 is a diagram showing an example of terminal data 5D. The description goes on to data which is prepared in advance for advertisement delivery.

With the cloud print server 2, the user data storage portion 201 stores, therein, the user data 5A on a user-by-user basis as shown in FIG. 8. The user data 5A includes the following information: "user code" indicating a user code of a user given to the corresponding user data 5A; "user name" indicating the name of the user; "department" indicating a division which the user in; and "interest" indicating something that the user enjoys learning about or doing.

The user data 5A is stored, in advance, in the user data storage portion 201. The user data 5A is updated appropriately in response to personnel transfer, change in interest, and so on.

Referring to FIG. 9, the advertisement data storage portion 202 has stored therein, for each advertisement (advertisement content) 6B, advertisement data 5B based on which an advertisement 6B is reproduced. The advertisement data 5B is so stored as to correspond to an advertisement code for identifying the advertisement 6B and to a target user to whom the advertisement 6B is to be shown.

The advertisement data 5B is, for example, a file of a format such as Portable Document Format (PDF), Graphics Interchange Format (GIF), or Tagged Image File Format (TIFF).

Referring to FIG. 10, the device data storage portion 203 has stored multifunction device data 5C therein for each image forming apparatus 1. The multifunction device data 5C indicates an IP address of the image forming apparatus 1 and a location at which the image forming apparatus 1 is installed (installation location). In this embodiment, the installation location is written as latitude and longitude.

With the image forming apparatus 1, the terminal data storage portion 101 has stored terminal data 5D therein for each user as shown in FIG. 11. The terminal data 5D indicates a user code and an identifier of the terminal 3 of the corresponding user. In this embodiment an example is described in which the identifier is an e-mail address.

It is noted, however, that terminal data 5D for some of the users is not stored the terminal data at rag portion 101 in some cases.

[Processing for Cloud Print]

Figure 12:
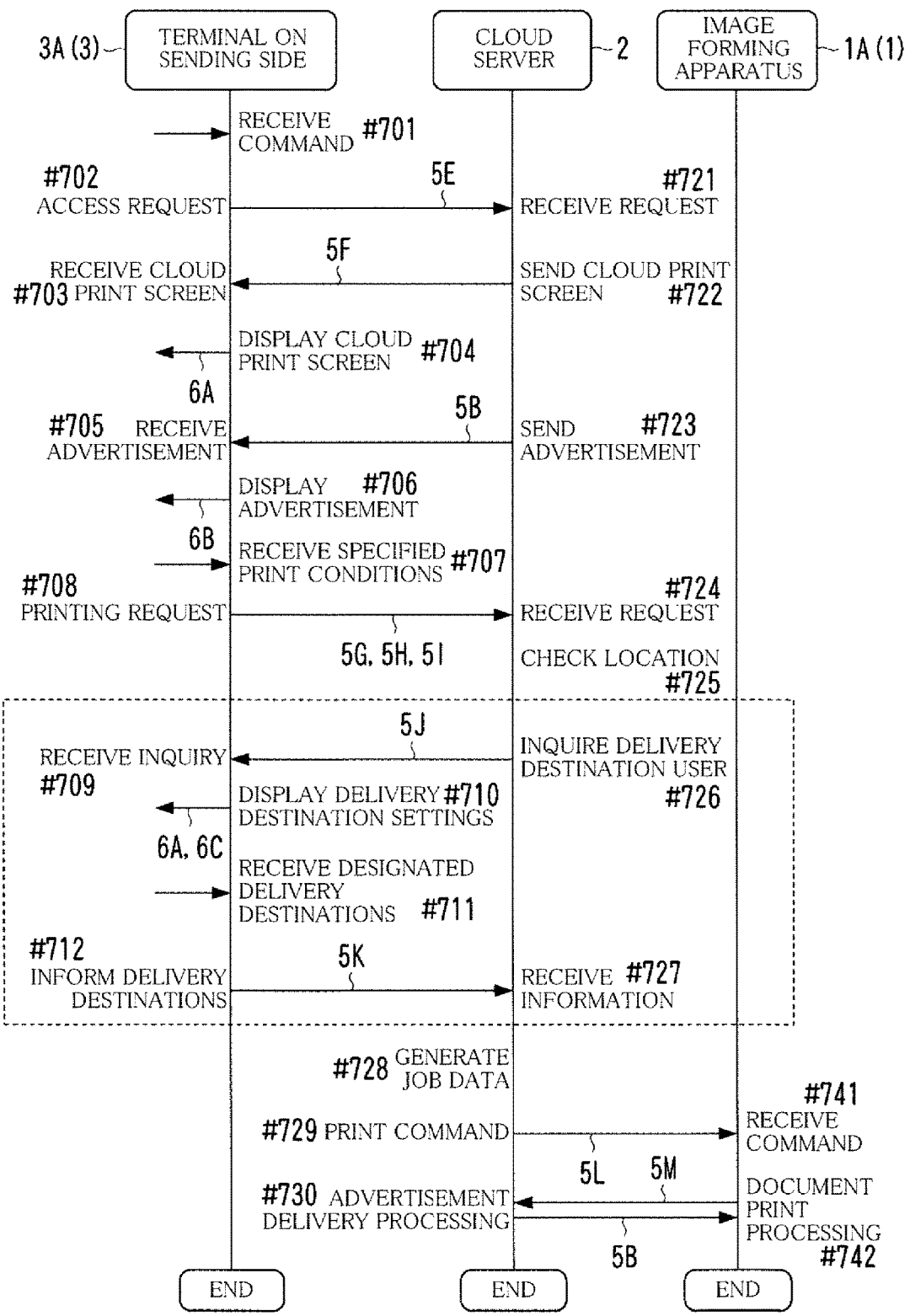
FIG. 12 is a sequence diagram depicting an example of the flow of the processing by an image forming apparatus, a cloud print server, and a terminal.
Figure 13A:
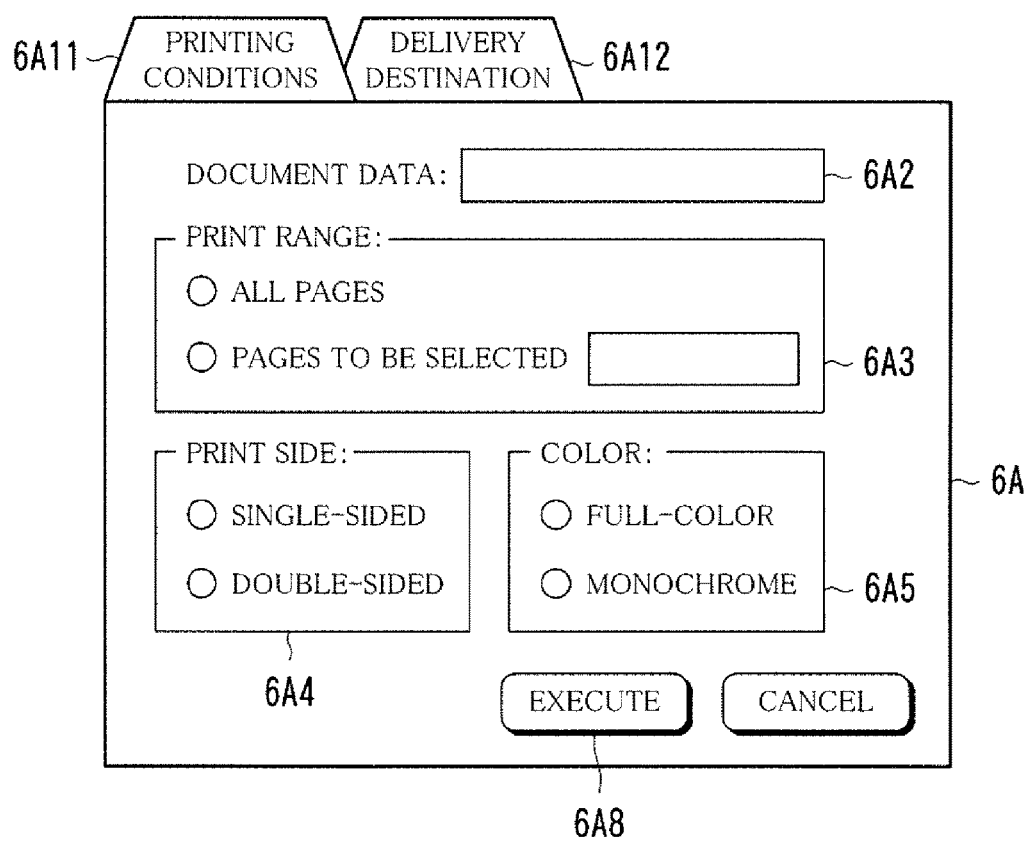
FIGS. 13A and 13B are diagrams showing an example of a cloud print screen.
Figure 13B:
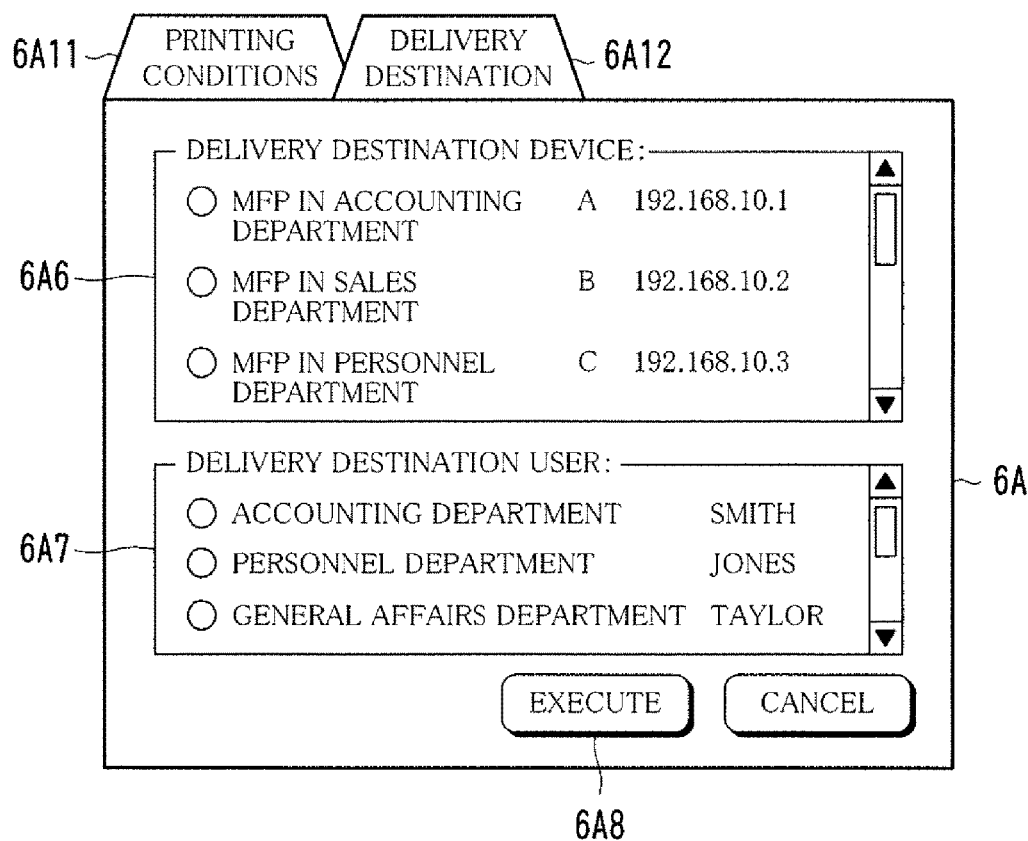
Figure 14:
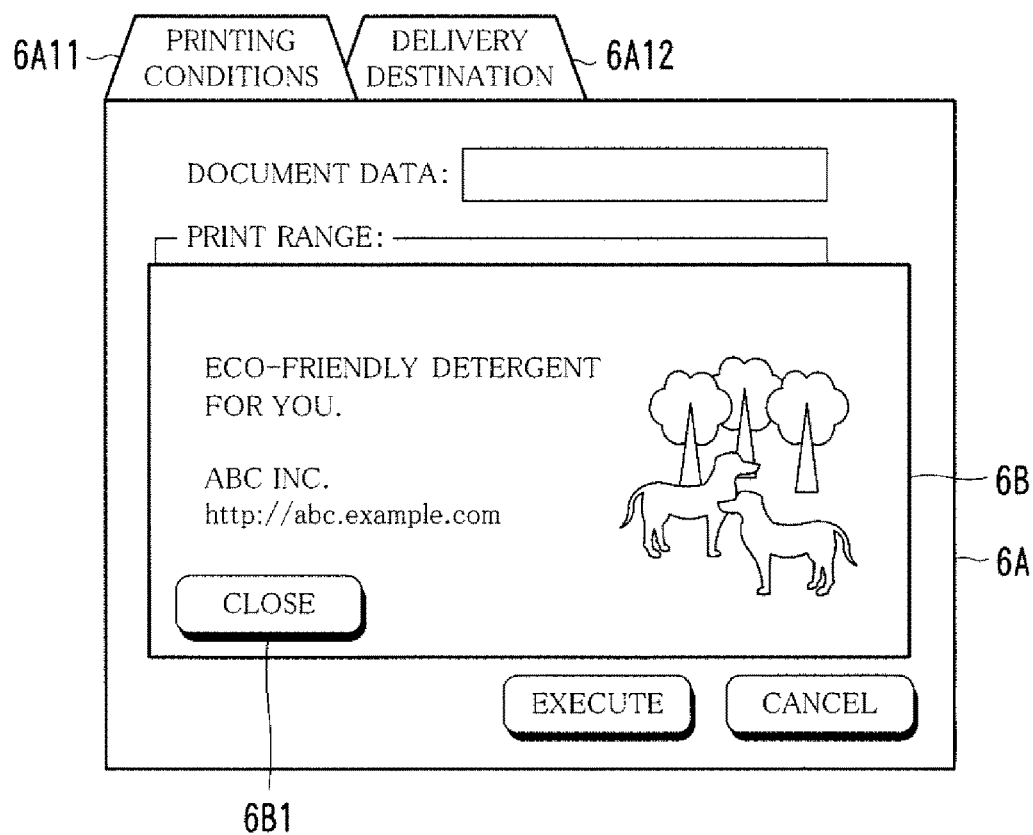
FIG. 14 is a diagram showing an example of an advertisement.
Figure 15:
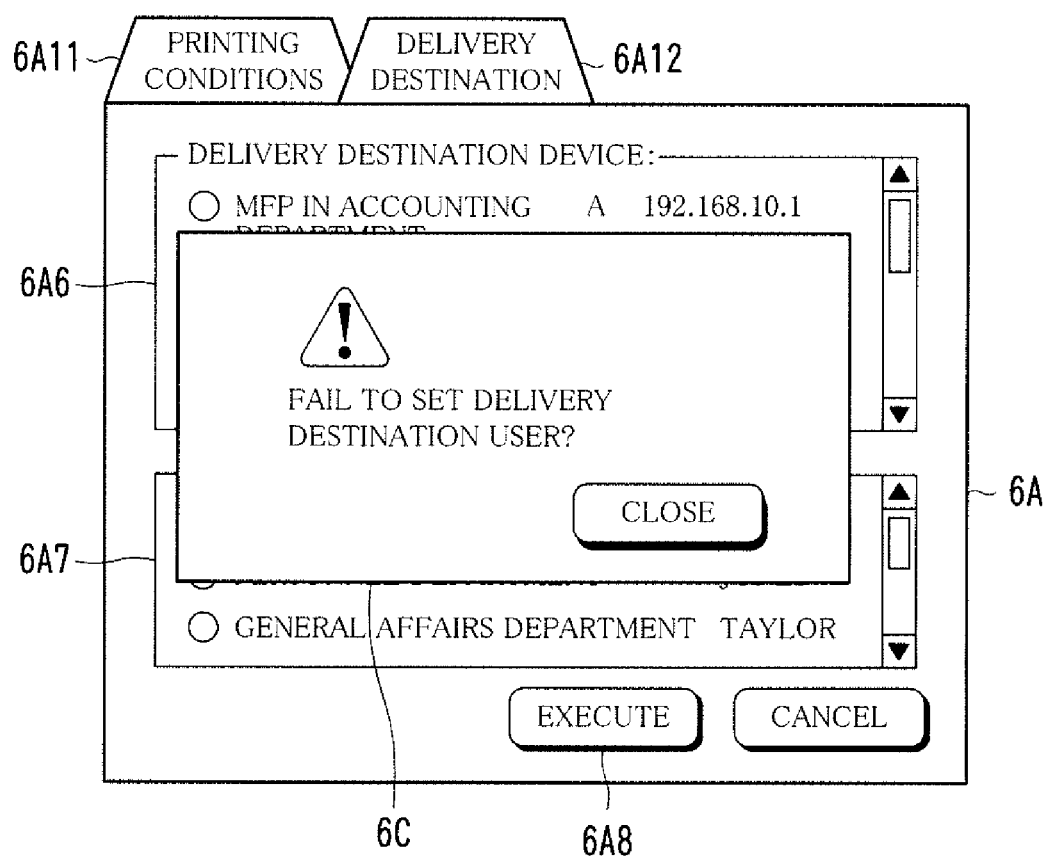
FIG. 15 is a diagram showing an example of a dialog box.
Figure 17:
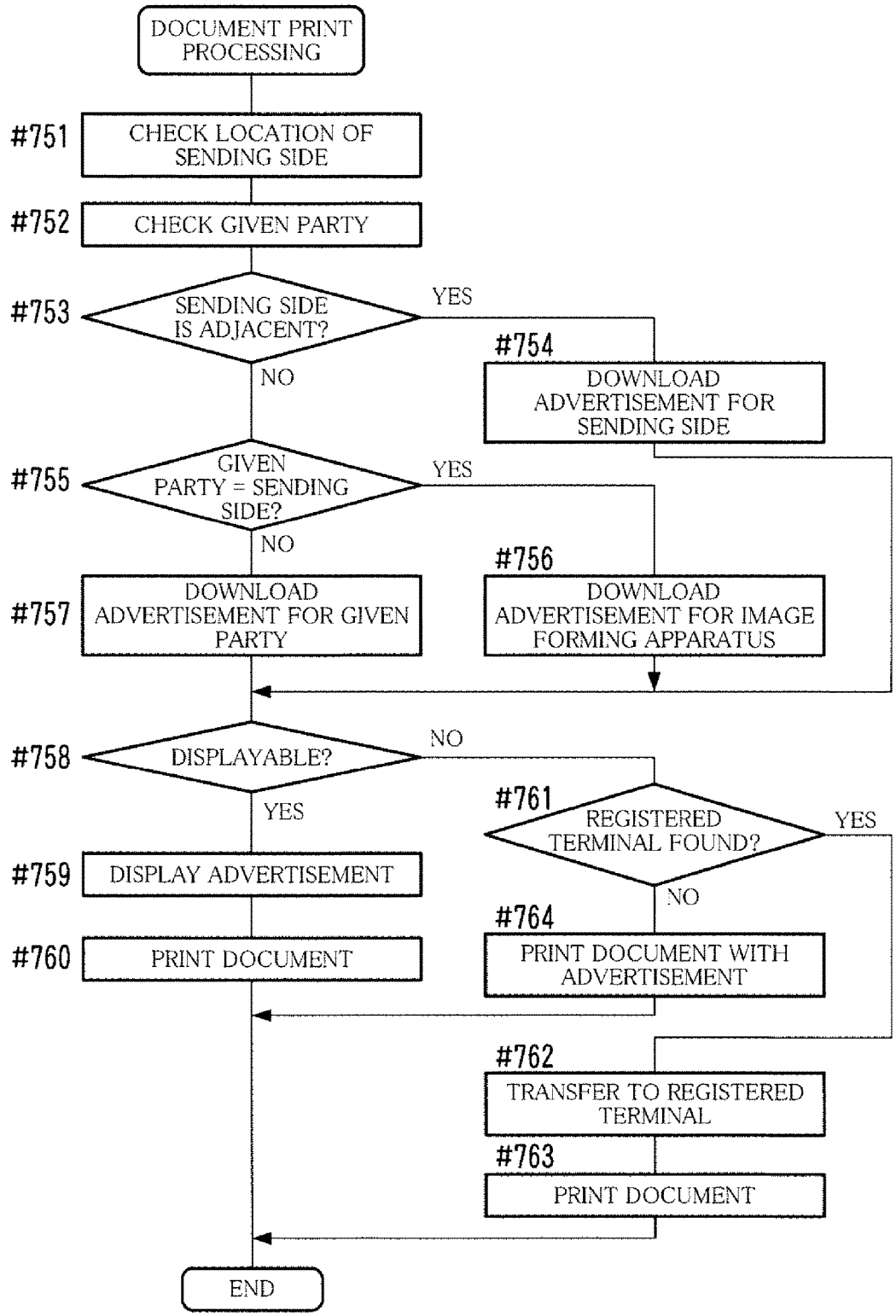
FIG. 17 is a flowchart depicting an example of the flow of document print processing.
Figure 18:
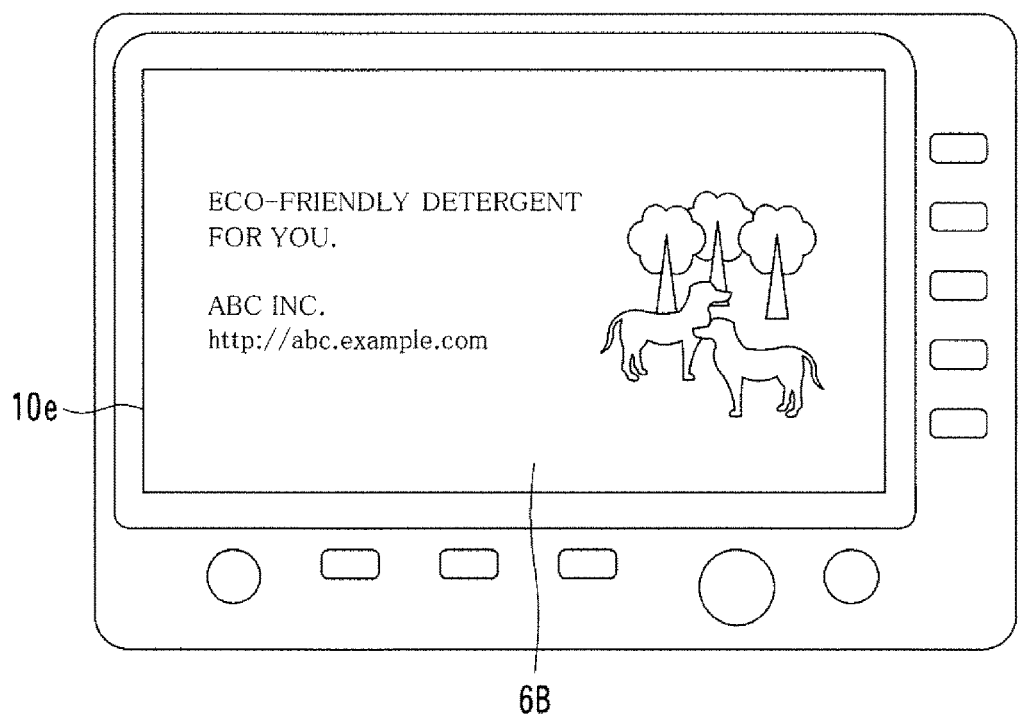
FIG. 18 is a diagram showing an example as to how an advertisement is displayed in an image forming apparatus.
Figure 19:
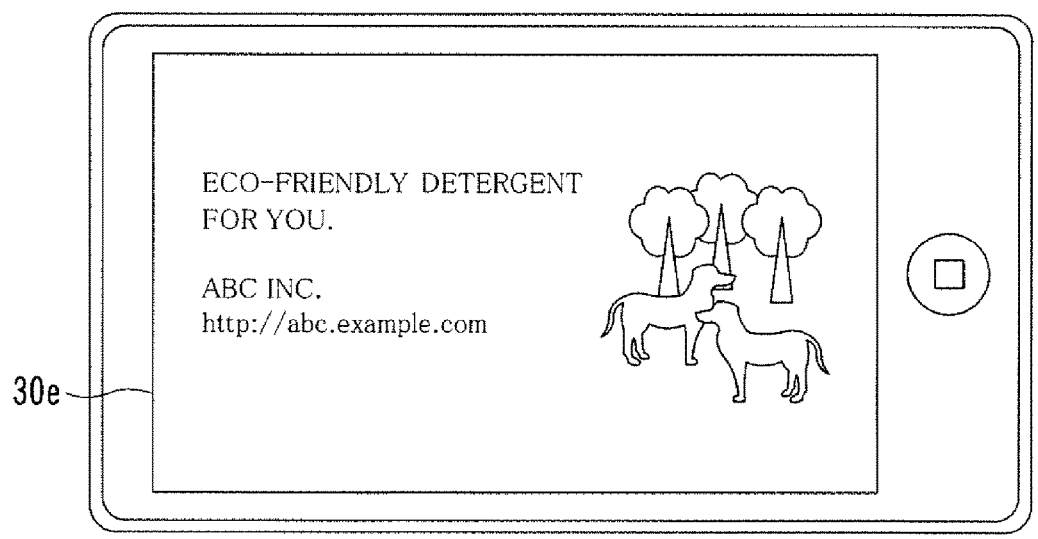
FIG. 19 is a diagram showing an example as to how an advertisement is displayed in a terminal.
Figure 20:
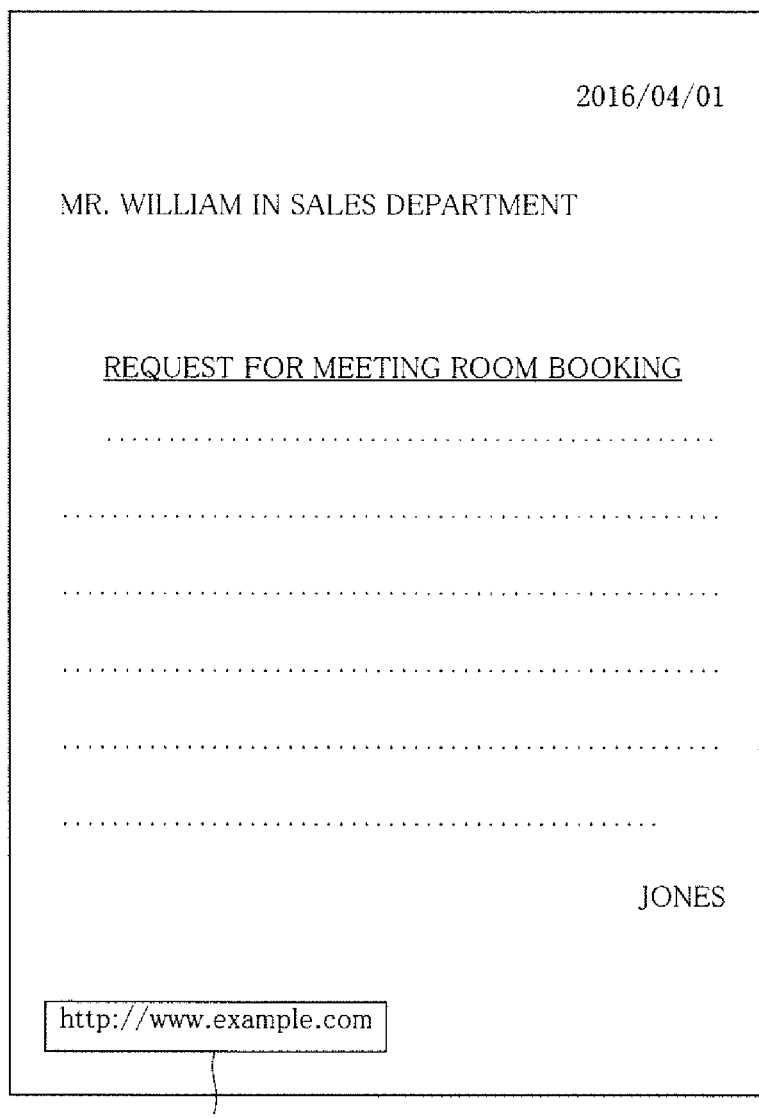
FIG. 20 is a diagram showing an example as N how an advertisement and a document are printed.

FIG. 12 is a sequence diagram depicting an example of the flow of the processing by the image forming apparatus 1, the cloud print server 2, and the terminal 3. FIGS. 13A and 13B are diagrams showing an example of a cloud print screen 6A. FIG. 14 is a diagram showing an example of an advertisement 6B. FIG. 15 is a diagram showing an example of a dialog box 6C. FIG. 16 is a diagram showing an example of job data 5L. FIG. 17 is a flowchart depicting an example of the flow of document print processing. FIG. 18 is a diagram showing an example as to how the advertisement 6B is displayed in the image forming apparatus 1. FIG. 19 is a diagram showing an example as to how the advertisement 6B is displayed in the terminal 3. FIG. 20 is a diagram showing an example as to how the advertisement 6B and a document 6H are printed.

The description goes on to user operation and the processing by the individual portions for the case where cloud print is conducted. The description is provided with reference to the sequence diagram of FIG. 12 and so on.

A user prepares, in the terminal 3, data on a document to be printed via cloud print. Such a document is hereinafter referred to as the "document 6H". For example, the us ex prepares a PDF file of the document 6H (FIG. 20).

The user operates his/her terminal 3 to start the client program 30P. The user then enters a predetermined command. The user is hereinafter referred to as a "sending user". In this example, the terminal 2 of the sending user is the terminal 3A.

With the terminal 3A, when the client program 30P starts, the cloud print screen request portion 301 through the cloud print request portion 305 perform processing in the following manner.

The cloud print screen request portion 301 receives an entry of the predetermined command (Step #701 of FIG. 12) to request date for the cloud print screen 6A from the cloud print server 2 (Step #702). At this time, the cloud print screen request portion 301 sends screen request data 5E indicating a user code of the sending user to the cloud print server 2.

The "cloud print screen 6A" is a screen on which conditions and, command for cloud print are entered as shown in FIGS. 13A and 13B. The cloud print screen 6A is detailed later.

With the cloud print server 2, when receiving the screen request data 5E from the terminal 3A (Step #721), the cloud print screen transmission portion 204 sends, to the terminal 3A, screen data 5F based on which the cloud print screen 6A is displayed (Step #722).

The first advertisement transmission portion 205 performs processing for sending, to the terminal 3A, advertisement data 5B on an advertisement 6B suitable for the sending user in the following manner (Step #723).

The first advertisement transmission portion 205 searches in the user data storage portion 201 for user data 5A indicating the user code shown in the screen request data 5E. The first advertisement transmission portion 202 searches, in the advertisement data rage portion 202, for advertisement data 5B on an advertisement 6B corresponding to a department or interest indicated in the user data 5A.

For example, the first advertisement transmission portion 205 searches for advertisement data 5B containing a word in which the sending user expresses an interest. Alternatively, the first advertisement transmission portion 205 searches for advertisement data 5B that is associated with the department as a target.

The first advertisement transmission portion 205 then sends the advertisement data 5B found out by the search to the terminal 3A.

With the terminal 3A, when receiving the screen data 5F (Step #703), the cloud print screen display portion 302 displays the cloud print screen 6A on the touch-sensitive panel display 30e based on the screen data 5F (Step #704).

The advertisement display portion 303 receives the e advertisement data 5B (Step #705). The advertisement display portion 303 displays, based on the advertisement data 5B, a screen including the advertisement 6B above the cloud print screen 6A on the touch-sensitive panel display 30e (Step #706).

This enables the sending user to read the advertisement 6B. The sending user reads through the advertisement 6B to select a close button 6B1 on the screen.

In response to the close button selected the advertisement display portion 303 finishes displaying the screen for the advertisement 6B. The entirety of the cloud print screen 6A then appears again.

Meanwhile, as shown in FIGS. 13A and 13B, the cloud print screen 6A has two tabs 6A11 and 6A12. Selecting the tab 6A11 causes the cloud print screen display portion 302 to switch the cloud print screen 6A to a first mode as shown in FIG. 13A. In the first mode, settings for printing conditions are made.

A text box 6A2 is used to specify therein data on the document 6H. The sending user enters an identifier of the prepared data (file name, for example) into the text box 6A2 to specify the data.

A settings region 6A3 is used to specify which page of the document 6H is to be printed. In order to print all the pages of the document 6H, the sending user selects a radio button that lies to the left of the character string "all pages". In order to print some of the pages of the document 6H, the sending user selects a radio button that lies to the left of the character string "pages to be selected" and then enters the number of page to be printed into a text box that lies to the right of the character string.

A settings region 6A4 is used to specify a print side of paper onto which the document 6H is to be printed. In order to print onto only one side of the paper, the sending user selects a radio button that lies to the left of the character string "single-sided". In order to print onto both sides of the paper, the sending user selects a radio button that lies to the left of the character string "double-sided".

A settings region 6A5 is used to specify a print color. In order to print the document 6H in full-color, the sending user selects a radio button that lies to the left of the character string "full-color". In order to print the document 6H in monochrome, the sending user selects a radio button that lies to the left of the character string "monochrome".

Selecting the tab 6A12 uses the cloud print screen display portion 302 to switch the cloud print screen 6A to a second mode as shown in FIG. 13B. In the second mode, selections are made of the image forming apparatus 1 that is to conduct printing of the document 6H and of a party to which a printed matter of the document 6H is given. Such an image forming apparatus 1 is hereinafter referred to as a "delivery destination device". Such a party in hereinafter referred to as a "delivery destination user".

A settings region 6A6 is used to specify a delivery destination device. The sending user specifies the delivery destination device by selecting a radio button corresponding thereto.

A settings region 6A7 is used to specify a delivery destination user. The sending user specifies the delivery destination user by selecting a radio button corresponding thereto.

The default mode of the cloud print screen 6A is the first mode. At a time when the screen data 5F is received, the cloud print screen display portion 302 displays the cloud print screen 6A in the first mode.

The sending user specifies or selects the foregoing matters appropriately to press an execute button 6A8.

In response to this operation, the cloud print request portion 305 receives the content specified or selected (Step #707), and sends print request data 5G, document data 5H, and current location data 5I to the cloud print server 2 (Step #708).

The print request data 5G indicates the received content such as print range conditions, print side conditions, color conditions, an IP address of the d livery destination device, and a user code of the delivery destination user. The document data 5H is data specified in the text box 6A2, namely, data on the document 6H. The current location data indicates the current location and an IP address of the subject terminal 3A and a user code of the user who possesses the terminal 3A.

In order to obtain a printed matter of the document 6H, the sending user may be set the sending user himself/herself as the delivery destination user. Alternatively, it is possible to set no delivery destination user. Where no delivery destination user is set, the print request data 5G shows no user codes of delivery destination users.

With the cloud print server 2, the print job generation portion 206 receives the print request data 5G, the document data 5H, and the current location data 5I (Step #724). The print job generation portion 206 performs processing for generating data for a cloud print job based on the data received and in coordination with the delivery destination user inquiry portion 207 in the following manner.

The delivery destination user inquiry portion 207 determines whether or not a distance between the current location of the terminal 3A and the installation site of the delivery destination device is longer than a predetermined distance, for example, 20 meters (Step #725). The current location of the terminal 3A is indicated in the current location data 5I. The print request data 5G indicates an IP address of the delivery destination device. The installation site of the delivery destination device is indicated in the multifunction device data 5C (FIG. 10) indicating the IP address of the delivery destination device.

Where the distance between the current location of the terminal 3A and the installation site of the delivery destination device is loner than the predetermined distance and where the print request data 5G shows no user codes of delivery destination users, the delivery destination user inquiry portion 207 inquires of the terminal 3A who is the delivery destination user (Step #726). At this time, the delivery destination user inquiry portion 207 sends, to the terminal 3A, inquiry data 5J based on which the dialog box 6C is displayed.

With the terminal 3A, when receiving the inquiry data 5J (Step #709), the cloud print screen display portion 302 displays the cloud print screen 6A in the second mode and displays, above the cloud print screen 6A, a dialog box 6C for prompting the sending user to set a delivery destination user as shown in FIG. 15 (Step #710).

The sending user confirms the dialog box 6C and closes the dialog box 6C. The sending user sets the delivery destination user, if necessary, in the settings region 6A7, and presses the execute button 6A8. It is also possible to press the execute button 6A8 with no delivery destination users set.

When the execute button 6A8 is pressed, the delivery destination user reply portion 306 receives the content of settings (Step #711) to send reply data 5K to the cloud print server 2 (Step #712).

The reply data 5K indicates a user code of the delivery destination user thus set. When no delivery destination user is set, no user code is indicated in the reply data 5K.

The terminal 3A may display a screen different from the cloud print screen 6A in Step #711 and allow the sending user to set a delivery destination user.

The delivery destination user inquiry portion 207 receives the reply data 5K from the terminal 3A (Step #727).

Where the distance between the current location of the terminal 3A and the installation site of the delivery destination device is shorter than the predetermined distance, or, alternatively, where the print request data 5G indicates a user code of a delivery destination user, the processing from Steps #709 through #712 and the processing from Steps #726 and #727 are bypassed.

With the cloud print server 2, the print job generation portion 206 generates job data 5L as data for the cloud print job (Step #728). The job data 5L is used to print a document shown in the document data 5H, namely, the document 6H, in accordance with conditions specified in the print request data 5G. The job data 5L is preferably described in a known language, for example, in Printer Job Language (PJL).

In this embodiment, as seen from FIG. 16, the job data 5L indicates the IP address and the current location of the terminal 3A, a user code of the user who possesses the terminal 3A, and a user code of the delivery destination user. The former user code is hereinafter referred to as a "sending user code" and the latter user code is hereinafter referred to as a "delivery destination user code". They are indicated in the current location data 5I or the print request data 5G. Where the current location data 5I shows no current location and where the reply data 5K shows a current location, the print job generation portion 206 generates the job data 5L so as to indicate the current location. Where neither the current location data 5I nor the reply data 5K indicates a current location, the print job generation portion 206 generates the job data 5L so as not to show the current location.

When the print job generation portion 206 generates the job data 5L, the print job transmission portion 208 sends the job data 5L to the image forming apparatus 1 that is indicated as the delivery destination device in the print request data 5G to request the image forming apparatus 1 to conduct printing (Step #729).

The print job transmission portion 208 may send the job data 5L to the image forming apparatus 1 irrespective of whether or not a request is made by the image forming apparatus 1. Alternatively, after receiving a request from the image forming apparatus 1, the print job transmission portion 208 may send the job data 5L to the image forming apparatus 1. In short, the print job transmission portion 208 may perform push-based delivery or pull-based delivery.

The description is provided below by taking an example in which the print job transmission portion 208 sends the job data 5L to the image forming apparatus 1A.

With the image forming apparatus 1A, the print job obtaining portion 102 obtains the job data 5L from the cloud print server 2 (Step #741). The print job obtaining portion 102 may obtain the job data 5L sent from the cloud print server 2 without requesting the job data 5L from the cloud print server 2. At regular intervals, or, in response to entry of a predetermined command, the print job obtaining portion 102 may request the job data 5L from the cloud print server 2 to download the same from the cloud print server 2.

The advertisement obtaining portion 103 through the document printing portion 107 of the image forming apparatus 1A then perform processing for outputting the document 6H and the advertisement 6B (Step #742). The steps of the processing is depicted in FIG. 17.

When the print job obtaining portion 102 obtains the job data 5L, the advertisement obtaining portion 103 selects an advertisement 6B to be outputted and obtains advertisement data 5B thereon in the following manner.

The advertisement obtaining portion 103 checks whether or not a distance between the current location (the current location of the terminal 3A in this example) indicated in the job data 5L and the installation site of the subject image forming apparatus 1A is longer than a predetermined distance (Step #751 of FIG. 17). The advertisement obtaining portion 103 also checks whether or not a sending user code indicated in the job data 5L matches a delivery destination user code (Step #752).

When the distance between the current location indicated in the job data 5L and the installation site of the subject image forming apparatus 1A is shorter than the predetermined distance, in other words, when the terminal 3A is in the vicinity of the image forming apparatus 1A (YES in Step #753), the advertisement obtaining portion 103 requests advertisement data 5B on an advertisement 6B suitable for the sending user from the cloud print server 2 to download the advertisement data 5B from the cloud print server 2 (Step #754). When requesting the advertisement data 5B, the advertisement obtaining portion 103 sends advertisement request data 5M to the cloud print server 2. The advertisement request data 5M indicates, in this example, a user code of the sending user.

Conversely, when the distance between the current location indicated in the job data 5L and the installation site of the subject image forming apparatus 1A is longer than the predetermined distance, in other words, when the terminal 3A is not in the vicinity of the image forming apparatus 1A (NO in Step #753), the advertisement obtaining portion 103 obtains the advertisement data 5B depending on the result of check in Step #752 in the following manner.

Where the sending user code matches the delivery destination user code, in other words, where the sending user gives a command for cloud print for himself/herself (YES in Step #755), the advertisement obtaining portion 103 requests, from the cloud print server 2, advertisement data 5B on an advertisement 6B suitable for a department where the subject image forming apparatus 1A is installed, and downloads the advertisement data 5B from the cloud print server (Step #756). When requesting the advertisement data 5B, the advertisement obtaining portion 103 sends, to the cloud print server 2, data indicating the department as the advertisement request data 5M. Where the job data 5L shows no delivery destination user codes, the advertisement obtaining portion 103 downloads advertisement data 5B on the advertisement 6B suitable for the department.

Where the sending user code is different from the delivery destination user code, in other words, where the sending user gives a command for cloud print for another user (NO in Step #755), the advertisement obtaining portion 103 requests, from the cloud print server 2, advertisement data 5B on an advertisement 6B suitable for the delivery destination user, and downloads the advertisement data 5B from the cloud print server 2 (Step #757). When requesting the advertisement data 5B, the advertisement obtaining portion 103 sends, to the cloud print server 2, data indicating the user code of the delivery destination user ac the advertisement request data 5M.

With the cloud print server 2, when receiving the advertisement request data 5M from the image forming apparatus 1A, the second advertisement transmission portion 209 sends the advertisement data 5B to the image forming apparatus 1A based on the advertisement request data 5M (Step #730 of FIG. 12).

Where the advertisement request data 5M indicates a user code, the second advertisement transmission portion 209 searches for user data 5A indicating the user code in the user data storage portion 201. A with the first advertisement transmission portion 205, the second advertisement transmission portion 209 searches, in the advertisement data storage portion 202, for advertisement data 5B on an advertisement 6B corresponding to the department or interest indicated in the user data 5A. The second advertisement transmission portion 209 then sends the advertisement data 5B found out by the search to the image forming apparatus 1A.

Alternatively, where the advertisement request data 5M indicates a department, the second advertisement transmission portion 209 searches for advertisement data 5B on an advertisement 6B corresponding to the department in the advertisement data storage portion 202. The second advertisement transmission portion 209 then send s the advertisement data 5B found out by the search to the image forming apparatus 1A.

With the image forming apparatus 1A, when the advertisement obtaining portion 103 obtains the advertisement data 5B, the output method determination portion 104, the advertisement display portion 105, the advertisement transfer portion 106, and the document printing portion 107 perform processing for outputting the advertisement 6B and the document 6H in the following manner.

Where displaying an image on the touch-sensitive panel display 10e is possible, in other words, where the image forming apparatus 1A is provided with the touch-sensitive panel display 10e and is ready to display an image (YES in Step #758), the output method determination portion 104 determines that an output method of the advertisement 6B is to "display", and the advertisement display portion 105 displays the advertisement 6B based on the advertisement data 5B on the touch-sensitive panel display 10e as shown in FIG. 18 (Step #759).

The document printing portion 107 prints the document 6H onto paper based on the job data 5L in parallel with the process for displaying the advertisement 6B or before or after the same (Step #760).

Where displaying an image is impassible (NO in Step #758), and where the terminal data storage portion 101 stores therein terminal data 5D (FIG. 11) of a target person to whom the advertisement is to be shown (YES in Step #761), the output method determination portion 104 determines that an output method of the advertisement 6B is to "transfer". The advertisement transfer portion 106 attaches the advertisement data 5B to an e-mail message and transfers the e-mail message to an e-mail address indicated in the terminal data 5D (Step #762).

With the terminal 3, in response to this operation, the advertisement display portion 303 displays the advertisement 6B based on the advertisement data 5B in the touch-sensitive panel display 30e as shown in FIG. 19.

The "target person to whom the advertisement 5B is to be shown" is a delivery destination user for the case where the advertisement data 5B is obtained in Step #757. The "target person to whom the advertisement 6B is to be shown" is a sending user for the case where the advertisement data 5B is obtained in Step #754 or #756.

The document printing portion 107 prints the document 6H onto paper based on the job data 5L in parallel with the process for transferring the advertisement 5B or before or after the same (Step #763).

Where displaying an image is impossible (NO in Step #758), and where the terminal data storage portion 101 stores therein no terminal data 5D at the target person to whom the advertisement 6B is to be shown (NO in Step #761), the output method determination portion 104 determines that an output method of the advertisement 6B to "print". The document printing portion 107 prints the document SR together with the advertisement 6B based on the advertisement data 5B and the job data 5L (Step #764).

For example, the advertisement 6B is printed onto the first sheet of paper and the document 6H is printed onto the second sheet of paper and beyond. For the document 6H having only one page, the document 6H may be printed onto the obverse side of paper and the advertisement 6B may be printed onto the reverse side of the paper. Alternatively, both the document 6H and the advertisement 6B may be printed onto one side of the paper. In such a case, the advertisement 6B may be printed in the form of banner advertisements. Yet alternatively, as shown in FIG. 20, a Uniform Resource Locator (URL) of a website for introducing products may be printed. The cloud print server 2 preferably delivers, to the image forming apparatus 1A, as the advertisement data 5B, data on the advertisement 6B to be printed onto a sheet different from the document 6H, and data on a banner or an URL used as the advertisement 6B.

In Step #756, the image forming apparatus 1 may download advertisement data 5B on an advertisement 6B suitable for the sending user.

According to this embodiment, in cloud print, an advertisement suitable for a user can be provided more securely than is conventionally possible. This is advantageous to an adviser as it enhances the advertising effectiveness, and also advantageous to the user as it exposes him/her more to interesting information.

In this embodiment, the cloud print server performs processing for sending the advertisement data 5B to each of the image forming apparatus 1 and the terminal 3 and processing for receiving the document data 5H from the terminal 3 to convert the document data 5H into the job data 5L to send the job data 5L to the image forming apparatus 1. Instead of this, the processing may be executed separately in different servers.

In this embodiment, the terminal 3 displays the advertisement 6B at the time of displaying the screen 6A (FIG. 14). Stated differently, the terminal 3 displays the advertisement 6B before a print command is received. Instead of this, the terminal 3 may display the advertisement 6B after a print command is received.

In this embodiment, the image forming apparatus 1 sends the advertisement data 55 to the terminal 3 via e-mail. Instead of this, the image forming apparatus may send the advertisement data 5B via Messenger or Social Networking Service (SNS).

In this embodiment, the cloud print server determines an advertisement 6B to be outputted to the image forming apparatus 1 in accordance with attributes of the delivery destination user or the sending user, for example, a department thereof. Instead of this, the image forming apparatus 1 may determine an advertisement 6B to be outputted to the image forming apparatus 1. Further, the cloud print server 2 determines attributes of the delivery destination user or the sending user. Instead of this, the image forming apparatus 1 may determine the attributes thereof. Then, when requesting an advertisement, the image forming apparatus 1 may inform the cloud print server 2 of the attributes determined.

The cloud print server 2 may send, without waiting for a request from the image forming apparatus 1, pieces of advertisement data 5B on advertisements 6B suitable for the sending user, the delivery destination user, and the department where the subject image forming apparatus 1A is installed together with the job data 5L.

The image forming apparatus 1 preferably selects advertisement data 5B and outputs the advertisement data 5B in accordance with the result of check as to whether or not a distance between the current location indicated in the job data 5L and the installation site of the subject image forming apparatus 1A is longer than a predetermined distance, and in accordance with the result of check as to whether or not a sending user code indicated in the job data 5L matches a delivery destination user code.

In this embodiment, where the print request data 5G shows no user codes of delivery destination users, and where a distance between the current location of the terminal 3 and the installation site of the image forming apparatus 1 that is the delivery destination device is longer than a predetermined distance, the cloud print server inquires of the terminal 1 about the delivery destination user. Instead of this, the cloud print server 2 may make such an inquiry for the case where the terminal 3 and the image forming apparatus 1 are not located in one network segment. Whether or not the terminal and the image forming apparatus 1 are located in one network segment may be determined based on the IP address of the terminal 3 and the IP address of the image forming apparatus 1 by using a known method. Alternatively, the cloud print server 2 may make such an inquiry for the case where the terminal 3 and the image forming apparatus 1 are not located in one area, for example, in one floor or in one building.

Likewise, in Step #751 of FIG. 17, the image forming apparatus 1 may check whether or not the terminal 3 and the subject image forming apparatus 1 are located in one network segment, instead of checking whether or not a distance between the current location of the terminal 3 and the installation site of the subject image forming apparatus 1 is longer than a predetermined distance. Alternatively, the image forming apparatus 1 may check whether or not the terminal 3 and the subject image forming apparatus 1 are located in one area.

Where the result of check shows that the terminal 3 and the subject image forming apparatus 1 are not located in one network segment or not located in one area, the image forming apparatus 1 may perform the subsequent processing, assuming that a distance therebetween is longer than the predetermined distance.

It is to be understood that the configurations of the printing system 100, the image forming apparatus 1, the cloud print server 2, and the terminal 3, the constituent elements thereof, the content and order of the processing, the configuration of data, the configuration of screen, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An advertisement providing system for outputting an advertisement when a printer prints a document, the system comprising:
    a display panel configured to display a screen for selecting a recipient that is to receive a printed matter of the document on condition that a distance between a first position and a second position is longer than a predetermined distance, or, alternatively, on condition that the first position and the second position are located in different areas, the first position showing where an instruction source giving a command to print the document is located, the second position showing where the printer is installed; and
    a memory storing a program having an output determination function that outputs, when the printer prints the document, an advertisement depending on attributes of the recipient selected.

2. The advertisement providing system according to claim 1, wherein
    when the printer is provided with a display panel, the output determination function of the program outputs the advertisement to the display panel of the printer to display the advertisement in the display panel of the printer, and
    when the printer is provided with no display panel, the output determination function of the program outputs the advertisement to a terminal of the recipient, or, alternatively, outputs the advertisement to the printer to cause the printer to print the advertisement together with the document.

3. A print control system for controlling a printer to print a document sent from a terminal, the system comprising:
    a processor; and
    a transmitter; wherein
    the processor performs display control processing for displaying a screen for requesting an instruction source, which gives a command to print the document, to select a recipient that is to receive a printed matter of the document on condition that a distance between a first position and a second position is longer than a predetermined distance, or, alternatively, on condition that the first position and the second position are located in different areas, the first position showing where the instruction source is located, the second position showing where the printer is installed,
    the transmitter sends, when the instruction source selects the recipient, as advertisement data, first data used for outputting an advertisement depending on attributes of the recipient to the printer, and
    the transmitter sends document data for printing the document to the printer.

4. The print control system according to claim 3, wherein the processor performs the display control processing when the instruction source gives a command to print the document and the recipient is not selected.

5. The print control system according to claim 3, wherein the transmitter sends, as the advertisement data, second data used for outputting an advertisement depending on attributes of the instruction source when the recipient is not selected although the instruction source is requested to select the recipient.

6. The print control system according to claim 3, wherein, when the instruction source is selected as the recipient, the transmitter sends, as the advertisement data, third data used for outputting an advertisement depending on attributes of a place where the printer is installed instead of the first data.

7. The print control system according to claim 3, wherein the transmitter sends to the instruction source, as the advertisement data, fourth data used for outputting an advertisement depending on attributes of the instruction source.

8. An advertisement providing method for outputting an advertisement when a printer prints a document, the method comprising:
    performing display processing for displaying a screen for selecting a recipient that is to receive a printed matter of the document on condition that a distance between a first position and a second position is longer than a predetermined distance, or, alternatively, on condition that the first position and the second position are located in different areas, the first position showing where an instruction source giving a command to print the document is located, the second position showing where the printer is installed;
    performing print processing for printing the document onto paper; and
    performing output processing for outputting, as the advertisement, a first advertisement depending on attributes of the recipient selected.

9. The method according to claim 8, wherein the display processing is performed when the instruction source gives a command to print the document and the recipient is not selected.

10. The method according to claim 8, wherein, when the recipient is not selected although the instruction source is requested to select the recipient, as the output processing, processing is performed for outputting, as the advertisement, a second advertisement depending on attributes of the instruction source.

11. The method according to claim 8, wherein, when the instruction source is selected as the recipient, as the output processing, processing is performed for outputting, as the advertisement, a third advertisement depending on attributes of a place where the printer is installed instead of the first advertisement.

12. The method according to claim 8, comprising transmission processing for sending to the instruction source, as the advertisement, a fourth advertisement depending on attributes of the instruction source.

13. A non-transitory recording medium for storing a computer readable program used in a computer, the computer causing a printer to print a document sent from a terminal, the computer readable program controlling the computer to execute processing comprising:
    request processing for requesting an instruction source, which gives a command to print the document, to select a recipient that is to receive a printed matter of the document on condition that a distance between a first position and a second position is longer than a predetermined distance, or, alternatively, on condition that the first position and the second position are located in different areas, the first position showing where the instruction source is located, the second position showing where the printer is installed;

first transmission processing for sending, when the instruction source selects the recipient, as advertisement data, first data used for outputting an advertisement depending on attributes of the recipient to the printer; and second transmission processing for sending document data for printing the document to the printer.

14. The non-transitory recording medium according to claim 13, wherein the computer readable program controls the computer to execute the request processing when the instruction source gives a command to print the document and the recipient is not selected.

15. The non-transitory recording medium according to claim 13, wherein the computer readable program controls the computer to execute, when the recipient is not selected although the instruction source is requested to select the recipient, as the first transmission processing, processing for sending, as the advertisement data, second data used for outputting an advertisement depending on attributes of the instruction source.

16. The non-transitory recording medium according to claim 13, wherein the computer readable program controls the computer to execute, when the instruction source is selected as the recipient, as the first transmission processing, processing for sending, as the advertisement data, third data used for outputting an advertisement depending on attributes of a place where the printer is installed instead of the first data.

17. The non-transitory recording medium according to claim 15, wherein the computer readable program controls the computer to execute third transmission processing for sending to the instruction source, as the advertisement data, fourth data used for outputting an advertisement depending on attributes of the instruction source.

\* \* \* \* \*